United States Patent [19]

Baba et al.

[11] Patent Number: 4,645,896
[45] Date of Patent: Feb. 24, 1987

[54] METHOD AND APPARATUS FOR FLASH WELDING

[75] Inventors: Toshihiko Baba, Nishinomiya; Akiyoshi Uomori, Minoo; Junji Miyata, Itami, all of Japan

[73] Assignee: Mitsubishi Denki Kabushiki Kaisha, Tokyo, Japan

[21] Appl. No.: 665,158

[22] Filed: Oct. 26, 1984

[30] Foreign Application Priority Data

Oct. 28, 1983 [JP] Japan ................. 58-203314

[51] Int. Cl.[4] .............................. B23K 11/04
[52] U.S. Cl. ....................... 219/100; 219/97
[58] Field of Search ............... 219/97, 100, 101, 104

[56] References Cited

U.S. PATENT DOCUMENTS 2,399,453 4/1946 Sinclair ........................ 219/97
3,509,310 4/1970 Riley .......................... 219/97

FOREIGN PATENT DOCUMENTS 6790 1/1981 Japan ......................... 219/100

OTHER PUBLICATIONS

Fassnacht et al., "Flash Welding", Metals Handbook (American Society for Metals—Metals Park, Ohio), 1971, pp. 485–494.

Primary Examiner—E. A. Goldberg
Assistant Examiner—C. M. Sigda
Attorney, Agent, or Firm—Leydig, Voit & Mayer

[57] ABSTRACT

A method and apparatus for flash welding are disclosed wherein a first predetermined voltage is applied between a pair of workpieces to be welded to generate flashes therebetween, and a second predetermined voltage lower than the first predetermined voltage is then applied between the workpieces to maintain fine flashes when the temperature of weld surfaces of the workpieces has reached a predetermined temperature. The workpieces are upset when the total number of flashes has reached a predetermined value. The pressure welding is maintained with an upsetting pressure sufficient to upset the workpieces and slightly higher than a pressure at which the workpieces are deformed near their recrystallization temperature until the temperature of weld surfaces has decreased to lower than the recrystallization temperature. The applied voltage and the upsetting pressure are controlled in accordance with the weld progress.

10 Claims, 7 Drawing Figures (a) ELECTRODE TRAVEL (b) VOLTAGE ACROSS WORKPIECES (c) NUMBER OF FLASHES (d) TEMPERATURE (e) OIL PRESSURE (f) FORCE ON WORKPIECES

METHOD AND APPARATUS FOR FLASH WELDING

BACKGROUND OF THE INVENTION

This invention relates to method and apparatuses for flash welding a pair of workpieces.

In a conventional flash welding method, a pair of workpieces to be welded are movably supported by clampers, and at least one of the workpieces mounted on a movable bed is moved toward the other workpiece by a hydraulic cylinder. A voltage is applied across the workpieces to generate flashes between the workpieces for heating and melting the workpiece surfaces to be joined together. When the workpieces are sufficiently heated, they are upset with a predetermined upsetting force by the hydraulic cylinder. The upsetting force is removed from the workpieces when the welded portions of the workpieces are firmly put together.

In the above flash welding method, the voltage between the workpieces and the movement of the workpieces are respectively independently controlled in accordance with the lapse of time irrespective of the progress of actual welding, so that it is difficult to obtain welds of a higher quality.

During upsetting, the workpieces must be moved toward each other at a high speed to prevent the oxidation of the hot weld surfaces. In order to accelerate a workpiece together with a movable bed for carrying it at a high rate, a large force, such as 5 to 7 kg/mm$^2$, which is larger than the pressure required for upsetting, must be applied to the movable bed. Since the workpieces tend to buckle when such a high upsetting pressure is applied to the workpieces after the upsetting, the upsetting force must be removed from the workpieces after the workpieces have been upset by a predetermined upsetting quantity. Therefore, the body of the apparatus tends to vibrate during the upsetting process, and the workpieces may vibrate in the cooling process of the workpieces after their upsetting, the vibration having an adverse effect on the quality of the finished weld. Also, when a high upsetting pressure is applied to the workpieces, the apparatus must be heavy and large-sized to withstand the high upsetting pressure.

SUMMARY OF THE INVENTION

The principal object of the present invention is to provide a method and an apparatus for flash welding a pair of workpieces in which both the voltage applied to the workpieces and the movement of at least one of the workpieces towards the other workpiece can be controlled in accordance with the actual progress of welding, improving the quality of the finished welded portions.

Another object of the present invention is to provide a method and an apparatus for flash welding a pair of workpieces in which a low upsetting pressure is applied to upset the workpieces.

Another object of the present invention is to provide a method and an apparatus for flash welding a pair of workpieces in which the weight of the apparatus is reduced and the apparatus is compact.

Another object of the present invention is to provide a method and an apparatus for flash welding a pair of workpieces in which the workpieces do not severely vibrate in the cooling process after the upsetting.

With the above objects in view, the present flash welding method resides in a method for flash welding a pair of workpieces comprising the steps of supporting the pair of workpieces, applying a first predetermined voltage sufficient to generate flashes between the workpieces across the workpieces while moving at least one of the workpieces toward the other, sensing the temperature of the weld surfaces of the workpieces, decreasing said first predetermined voltage to a second predetermined voltage when the temperature of the weld surfaces of the workpieces has reached a predetermined temperature indicating that the weld surfaces are molten uniformly, said second predetermined voltage being lower than said first predetermined voltage but sufficient to maintain flashes between the workpieces, counting the total number of flashes which are generated after the voltage has been decreased to said second predetermined voltage, rapidly upsetting the workpieces with an upsetting force sufficient to upset the workpieces when the total number of flashes has reached a predetermined number indicative of a condition suitable for the upsetting, and removing said upsetting force from the workpieces when the temperature of the weld has decreased to lower than the recrystallization temperature of the workpieces.

The present flash welding apparatus resides in a flash welding apparatus comprising means for supporting a pair of workpieces to be welded with a predetermined distance therebetween, at least one of the workpieces being movable toward the other workpiece, means for applying a first predetermined voltage sufficient to generate flashes between the workpieces across the workpieces, means for moving at least one of the workpieces toward the other, means for sensing the temperature of weld surfaces of the workpieces, means for decreasing said first predetermined voltage to a second predetermined voltage when the temperature of the weld surfaces of the workpieces has reached a predetermined temperature indicating that the weld surfaces are molten uniformly, said second predetermined voltage being lower than said first predetermined voltage but sufficient to maintain flashes between the workpieces, means for counting the total number of flashes which are generated after the voltage has been decreased to said second predetermined voltage, means for rapidly upsetting the workpieces with an upsetting force sufficient to upset the workpieces when the total number of flashes has reached a predetermined number indicative of a condition suitable for the upsetting, and means for removing said upsetting force from the workpieces when the temperature of the weld has decreased to lower than the recrystallization temperature of the workpieces.

DESCRIPTION OF THE PREFERRED EMBODIMENT

Figure 1:
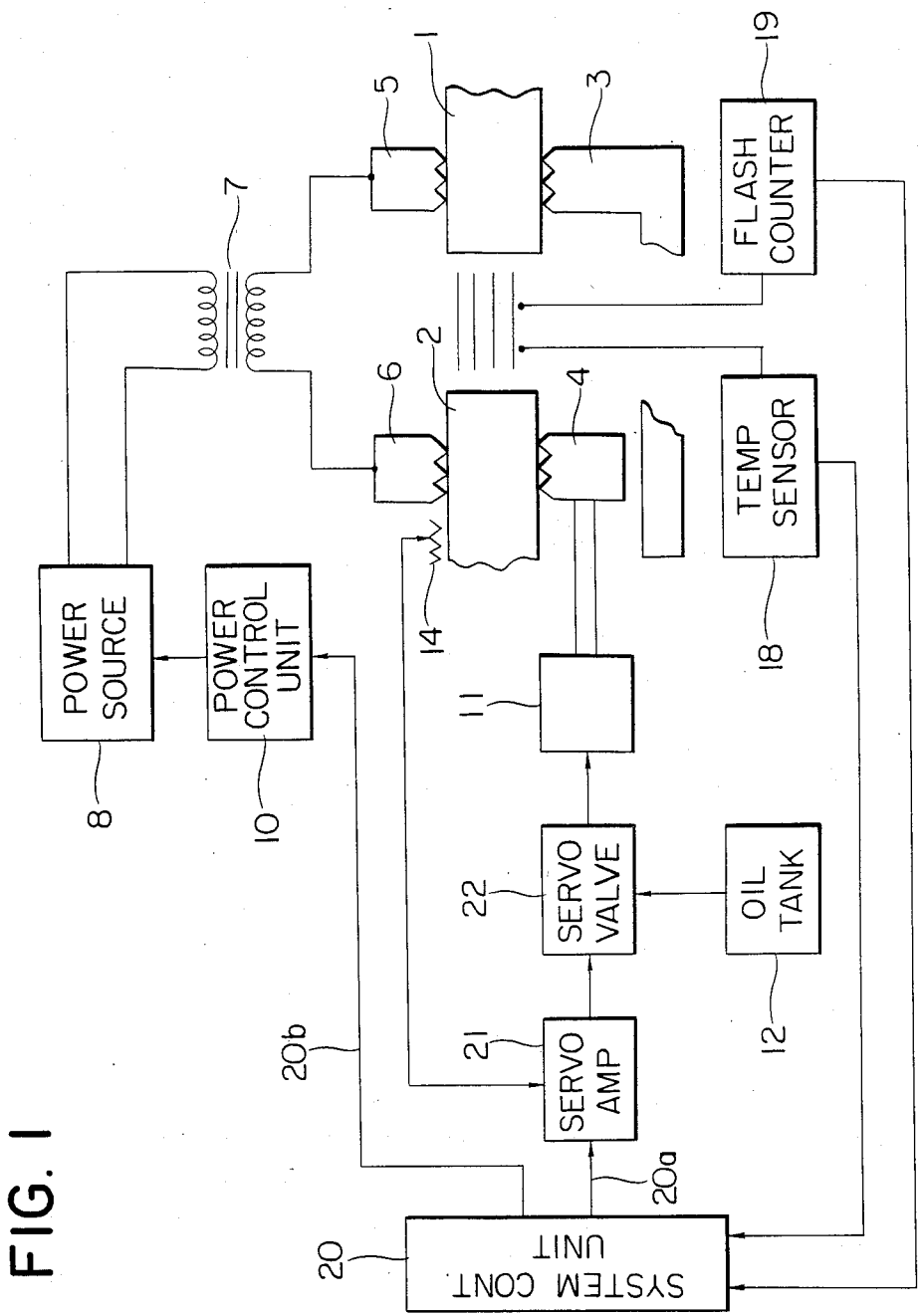
FIG. 1 is a block diagram showing an embodiment of the flash welding apparatus of the present invention.

Referring now to FIG. 1, in which one embodiment of the present invention is illustrated in the form of a block diagram, the flash welding apparatus of the present invention comprises two pairs of clamps 3, 5 and 4, 6 for separately supporting workpieces 1 and 2 to be welded. In order to apply a voltage between the workpieces 1 and 2, one of the jaws 5 and 6 of each pair of clamps 3 to 6 is connected to a secondary winding of an electrical transformer 7 which is connected at its primary winding to an electrical power source 8. The power source 8 is connected to a power control unit 10 and is controlled as will be explained in detail below. The jaws of the clamps 3 to 6 may be said to be a pair of electrodes for applying an electric voltage between the workpieces 1 and 2.

The jaw 4 is rigidly connected to a hydraulic cylinder 11 which pushes the clamps 4 and 6 and the workpiece 2 clamped therebetween toward the workpiece 1 clamped between the stationary jaws 3 and 5. In order to actuate the hydraulic cylinder 11, a servo valve 22 is connected between the hydraulic cylinder 11 and an hydraulic pump 12 from which a hydraulic fluid is supplied to the hydraulic cylinder 11. The servo valve 22 is connected to an output of a servo amplifier 21. One of inputs of the servo amplifier 21 is connected to a position detector 14 which detects the position of the movable workpiece 2 with respect to the stationary workpiece 1. The other input of the servo amplifier 21 is connected through a line 20a to a system control unit 20 which is also connected to the power control unit 10 through a line 20b. The flash welding apparatus further includes a temperature sensor 18, such as an infrared radiation thermometer, for sensing the temperature at the opposing surfaces of the workpieces 1 and 2. The output signal of the temperature sensor 18 is supplied to the system control unit 20. The flash welding apparatus also includes a flash counter 19, such as a counter for counting the number of pulse outputs from a phototransistor (not shown), for counting the number of flashes occurring between the opposing surfaces to be welded of the workpieces 1 and 2. The output signal from the flash counter 19 is supplied to the system control unit 20 wherein the signals from the temperature sensor 18 and the flash counter 19 are processed to control the outputs signals supplied to the power control unit 10 through the line 20b and to the servo amplifier 21 through the line 20a. Thus the output signal on the line 20b from the system control unit 20 regulates the voltage applied across the gap between the workpieces 1 and 2, and the output signal on the line 20a from the system control unit 20 regulates, in cooperation with the signal from the position detector 14, the operation of the hydraulic cylinder 11.

Figure 2:
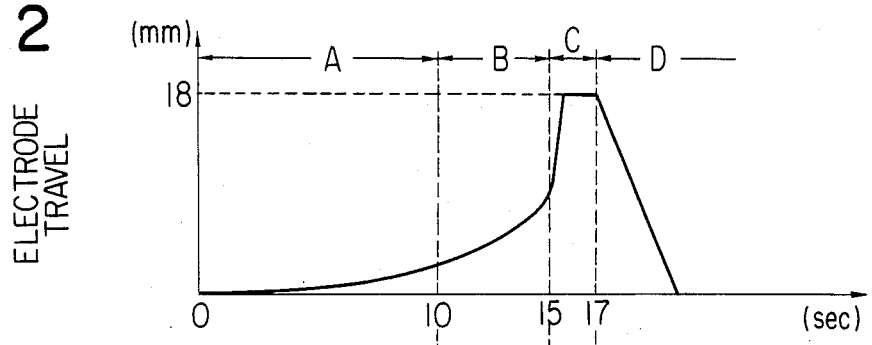
FIG. 2a is a graph showing the displacement of one electrode toward the other electrode with respect to time.
FIG. 2b is a graph showing the voltage applied between the workpieces with respect to time.
FIG. 2c is a graph showing the total number of flashes generated between the workpieces.
FIG. 2d is a graph showing the temperature of weld surfaces of the workpieces.
FIG. 2e is a graph showing the oil pressure applied to the hydraulic cylinder.
FIG. 2f is a graph showing the upsetting pressure applied to the workpieces.
Figure 2:
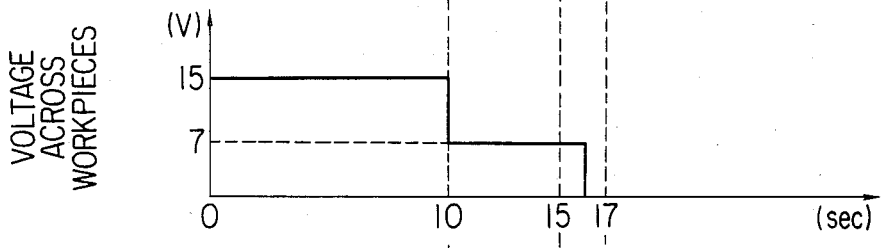
Figure 2:
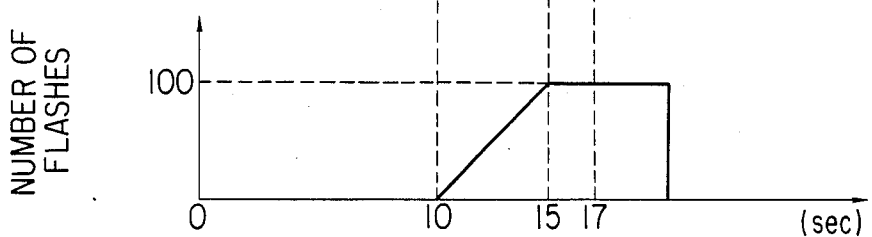
Figure 2:
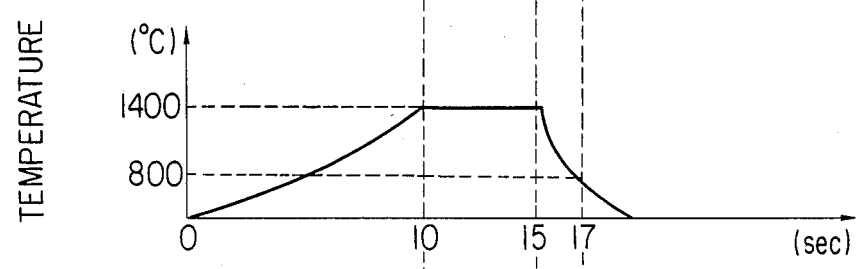
Figure 2:
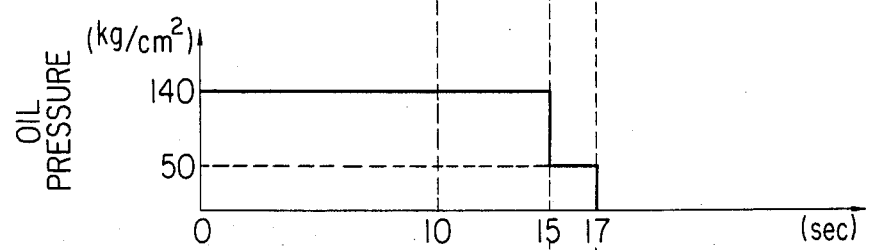
Figure 2:
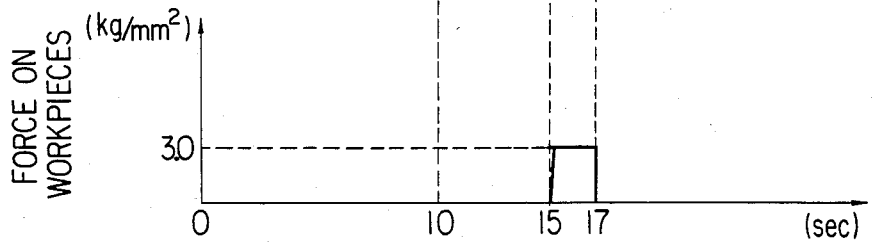

In operation in a first flashing step corresponding to time period A of FIG. 2a, the power control unit 10 is operated by a predetermined signal from the system control unit 20 such that a first predetermined voltage, corresponding to the materials of which the workpieces 1 and 2 are made, is applied between electrodes 5 and 6, and the movable workpiece 2 is made to move a prescribed distance. When the temperature sensor 18 detects the predetermined temperature such as 1400° C. set in the system control unit 20, a second flashing step corresponding to time period B is performed and the movable workpiece 2 is moved by the cylinder 11 a prescribed distance. At the same time, the counting device 19 begins to count the total number of flashes generated from the start of period B. When the counting device 19 detects the predetermined total number of flashes, such as 100, set in the system control unit 20, an upsetting step corresponding to time period C begins, and the movable workpiece 2 is rapidly moved toward the electrode 5 to perform the pressure welding of the workpieces 1 and 2. As shown in FIG. 2e, at the start of the upsetting step, the oil pressure transmitted to the hydraulic cylinder 11 is decreased from a first predetermined pressure, such as 140 kg/cm$^2$, to a second predetermined pressure, such as 50 kg/cm$^2$ lower than the first predetermined pressure. The second predetermined voltage between the workpieces is interrupted by the power control unit 10 during the upsetting step as shown in FIG. 2b. Then, as shown in FIGS. 2d and 2f, a cooling step corresponding to period D begins, and the welded portions are maintained, until their temperature has decreased to lower than a recrystallization temperature such as 800° C. of the workpieces 1 and 2, with an upsetting pressure thereon sufficient to upset the workpieces and slightly higher than a pressure by which the workpieces are deformed near the recrystallization temperature. The upsetting pressure is preferably 2 to 3 kg/mm$^2$ when the workpieces are made of soft steel. Then the upsetting force is removed from the workpieces by the cylinder 11.

As mentioned above, according to the present invention, a first predetermined voltage is applied between a pair of workpieces to generate flashes therebetween, and a second predetermined voltage lower than the first predetermined voltage is then applied between the workpieces to maintain fine flashes when the temperature of the weld surfaces of the workpieces has reached a predetermined temperature. Thus, the counting device 19 may begin counting the total number of flashes only after the voltage has been decreased to the second predetermined voltage. The workpieces are then upset when the total number of flashes, measured from the time that the second predetermined voltage is applied, has reached a predetermined value. The voltage applied to the workpieces is interrupted during the upsetting process. The pressure welding is maintained until the temperature of the weld surfaces has decreased to lower than the recrystallization temperature of the workpieces with an upsetting pressure sufficient to upset the workpieces and slightly higher than a pressure which the workpieces are deformed near the recrystallization temperature. Therefore, the applied voltage and the movement of the workpieces are controlled in accordance with the actual weld progress, improving the quality of the finished welded portions. In the present invention, the temperature of the weld surfaces is near the recrystallization temperature of the workpieces which is low in comparison with the conventional temperature of weld surfaces. Accordingly, in order to prevent the welded surfaces from oxidizing, it is not necessary to move one workpiece toward the other at a high speed as in conventional flash welding. Also, in the upsetting process, as the workpieces have already approached each other in accordance with the progress of the actual welding, the workpieces are moved by a distance shorter than that in the conventional upsetting process. Therefore, it is sufficient to apply to the workpieces an upsetting pressure lower than the conventional upsetting pressure. Further, since the temperature of the weld surfaces in the present invention is lower than the conventional weld surface temperature, the welded portions are not sufficiently recrystallized, which prevents the crystal grains of the welded portions from getting coarse, improving the quality of the welded portions. In addition, since a low upsetting pressure is applied to the workpieces, the weight of the apparatus can be reduced and the apparatus becomes compact, and further the electrodes do not severely vibrate in the cooling process.

What is claimed is:

1. A method for flash welding a pair of workpieces comprising the steps of:
   supporting the pair of workpieces to be welded with a predetermined distance therebetween, at least one of the workpieces being movable toward the other workpiece;
   applying a first predetermined voltage between the workpiece which is sufficient to generate flashes between the workpieces while moving at least one of the workpieces toward the other;
   sensing the temperature of the weld surfaces of the workpieces;
   decreasing said first predetermined voltage to a second predetermined voltage when the temperature of the weld surfaces of the workpieces has reached a predetermined temperature indicating that the weld surfaces are molten uniformly, said second predetermined voltage being lower than said first predetermined voltage but sufficient to maintain flashes between the workpieces;
   after the voltage has been decreased to said second predetermined voltage, initiating a count of the total number of flashes which are generated;
   rapidly upsetting the workpieces with an upsetting pressure sufficient to upset the workpieces when the total number of flashes has reached a predetermined number indicative of a condition suitable for the upsetting; and
   removing the upsetting force from the workpieces when the temperature of the weld has decreased to lower than the recrystallization temperature of the workpieces.

2. A method for flash welding as claimed in claim 1, wherein said temperature sensing step comprises detecting the temperature of the weld surfaces by measuring infrared radiation emitted from the workpieces.

3. A method for flash welding as claimed in claim 1, wherein said counting step comprises detecting the flashes by a light sensor.

4. A method for flash welding as claimed in claim 1, wherein the workpieces are made of soft steel and said upsetting pressure is 2 to 3 kg/mm$^2$.

5. A flash welding apparatus comprising:
   means for supporting a pair of workpieces to be welded with a predetermined distance therebetween, at least one of the workpieces being movable toward the other workpiece;
   means for applying a first predetermined voltage sufficient to generate flashes between the workpieces across the workpieces;
   means applying a first force for moving at least one of the workpieces toward the other;
   means for sensing the temperature of the weld surfaces of the workpieces;
   means for decreasing said first predetermined voltage to a second predetermined voltage when the temperature of the weld surfaces of the workpieces has reached a predetermined temperature indicating that the weld surfaces are molten uniformly, said second predetermined voltage being lower than said first predetermined voltage but sufficient to maintain flashes between the workpieces;
   means for counting only after the voltage has been decreased to said second predetermined voltage the total number of flashes which are generated;
   means for decreasing said first force to a lower force and rapidly moving said movable workpiece toward said stationary workpiece and upsetting the workpiece with an upsetting pressure sufficient to upset the workpieces when the total number of flashes has reached a predetermined number indicative of a condition suitable for the upsetting; and
   means for removing the upsetting force from the workpieces when the temperature of the weld has decreased to lower than the recrystallization temperature of the workpieces.

6. A flash welding apparatus as claimed in claim 5, wherein said temperature sensing means comprises an infrared thermometer measuring infrared radiation.

7. A flash welding apparatus as claimed in claim 5, wherein said flash counting means comprises a light sensor for sensing flashes and a counter for counting the number of outputs from said light sensor.

8. A method for flash welding as claimed in claim 2 wherein said counting step comprises detecting the flashes by a light sensor.

9. A method for flash welding as claimed in claim 2 wherein the workpieces are made of soft steel and said upsetting pressure is 2 to 3 kg/mm$^2$.

10. A flash welding apparatus as claimed in claim 6 wherein said flash counting means comprises a light sensor for sensing flashes and a counter for counting the number of outputs from said light sensor.

* * * * *